(12) United States Patent
Harata et al.

(10) Patent No.: US 7,494,174 B2
(45) Date of Patent: Feb. 24, 2009

(54) INTERIOR PART OF VEHICLE

(75) Inventors: Hiroaki Harata, Yokohama (JP);
Hiroaki Miura, Kamakura (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/319,705

(22) Filed: Dec. 29, 2005

(65) Prior Publication Data

US 2006/0103161 A1     May 18, 2006

Related U.S. Application Data

(62) Division of application No. 10/609,559, filed on Jul. 1, 2003, now abandoned.

(30) Foreign Application Priority Data

Jul. 10, 2002     (JP)     .......................... P2002-201638

(51) Int. Cl.
    B62D 25/14     (2006.01)
(52) U.S. Cl. .......................................... 296/70; 296/72
(58) Field of Classification Search .................... 296/70, 296/72, 193.02; 280/752; 180/90
    See application file for complete search history.

(56) References Cited

U.S. PATENT DOCUMENTS

| | | | | |
|---|---|---|---|---|
| 2,818,933 A | * | 1/1958 | Tell ............................... | 296/70 |
| 3,774,713 A | * | 11/1973 | Stegmaier ..................... | 180/90 |
| 5,333,901 A | * | 8/1994 | Barnes .......................... | 180/90 |
| 5,549,324 A | * | 8/1996 | Labrie et al. ............... | 280/728.3 |
| 5,549,344 A | * | 8/1996 | Nishijima et al. ............. | 296/70 |
| 5,685,595 A | * | 11/1997 | Nishijima et al. ............. | 296/70 |
| 5,707,098 A | * | 1/1998 | Uchida et al. ............. | 296/146.6 |
| 5,806,916 A | * | 9/1998 | Sinner et al. ................... | 296/72 |
| 5,833,304 A | * | 11/1998 | Daniel et al. ................. | 296/214 |
| RE36,167 E | * | 3/1999 | Barnes ......................... | 180/90 |
| 5,934,744 A | * | 8/1999 | Jergens et al. ................. | 296/70 |
| 5,979,965 A | * | 11/1999 | Nishijima et al. ............. | 296/70 |
| 6,089,642 A | * | 7/2000 | Davis et al. ................... | 296/70 |
| 6,145,870 A | * | 11/2000 | Devane et al. ........... | 280/728.2 |
| 6,409,590 B1 | * | 6/2002 | Suzuki et al. ................. | 296/70 |
| 6,601,902 B1 | * | 8/2003 | Rahmstorf et al. ............ | 296/70 |
| 6,685,261 B2 | * | 2/2004 | Brancheriau et al. ........ | 296/208 |
| 6,688,680 B1 | * | 2/2004 | Cooper et al. ................. | 296/70 |
| 6,692,017 B2 | * | 2/2004 | Taoka et al. ............. | 280/728.2 |
| 6,705,659 B2 | * | 3/2004 | Suzuki et al. ................. | 296/70 |
| 6,705,672 B2 | * | 3/2004 | Shikata et al. ................ | 296/70 |
| 6,761,375 B2 | * | 7/2004 | Kurachi et al. ........... | 280/728.2 |

FOREIGN PATENT DOCUMENTS

| | | |
|---|---|---|
| DE | 4019121 | 1/1991 |
| GB | 2032360 | 6/1979 |
| JP | 58-132740 | 9/1983 |

(Continued)

*Primary Examiner*—Kiran B. Patel
(74) *Attorney, Agent, or Firm*—McDermott Will & Emery LLP

(57) ABSTRACT

An interior part of a vehicle comprises an outer wall constituted by a resin and/or a material containing the resin, and a thermal conductive member joined to the outer wall. The thermal conductive member is partially joined to a vehicle body panel and/or a metal part engaged with the vehicle body panel, so that temperature increase in a vehicle cabin is controlled effectively.

7 Claims, 9 Drawing Sheets

FOREIGN PATENT DOCUMENTS

| | | |
|---|---|---|
| JP | 11-245689 | 9/1999 |
| JP | 2001-500818 | 1/2001 |
| JP | 2001-114149 | 4/2001 |
| JP | 2001-122044 | 5/2001 |
| JP | 2001-277396 | 10/2001 |
| JP | 2002-316562 | 10/2002 |
| JP | 2004-528222 | 9/2004 |
| WO | WO 94/14629 | 7/1994 |

* cited by examiner

INTERIOR PART OF VEHICLE

This application is a divisional application of Ser. No. 10/609,559, filed Jul. 1, 2003, now abandoned which claims priority of Japanese Patent application No. P2002-201638, filed Jul. 10, 2002, and the contents of which are herewith incorporated by reference.

BACKGROUND OF THE INVENTION

1. Field of the Invention

The present invention relates to an interior part of a vehicle.

2. Description of the Related Art

A temperature in a vehicle cabin becomes extremely high under the blazing sun in summer season. For example, in some cases, an air temperature in the vehicle cabin reaches nearly 70° C., and a surface temperature of an upper surface of an instrument panel reaches nearly 110° C.

Needless to say, it is unpleasant for occupants to ride in the vehicle under such a situation. In addition, even after the operation of ventilation or air-conditioning is started, a surface temperature of an interior part will not easily lowered, and radiation heat emanated over a long time greatly discomforts the occupants.

Further, the temperature increase of the interior part involves many problems in terms of design. For example, the interior part is generally composed of a material having a large coefficient of thermal expansion, such as resin or wooden board. Therefore, when the interior part is engaged with a vehicle body formed of a steel material with a small coefficient of thermal expansion, deformation of the part and interference thereof with the other parts occurs due to a discrepancy in the coefficients of thermal expansion. Hence, in order to prevent the deformation and interference of the parts, a use of expensive special parts, an improvement of design accuracy or an increase in the number of processes is required. This causes an increase in the cost of the interior parts.

In addition, a high quality material is required for the interior part in order to assure durability against discoloration at a high temperature and cracking due to repeated thermal expansion and contraction. As a consequence, an expensive material has been applied for the interior part.

Accordingly, various methods and technologies for restricting the increase of the surface temperature of the interior part have been proposed. Japanese Patent Application Laid-Open Nos. 2001-114149 and 2001-122044 disclose a method, in which an infrared reflective pigment is contained in the surface of the interior part.

Japanese Patent Translation Publication No. H8-507987 published in 1996 (PCT International Publication No. WO 94/14629) discloses a technology of diffusing heat to the entire part by extending a metal foil layer over an inner side of a skin from an upper region of the part, which receives direct rays, to a lower region thereof, which does not receive direct rays.

SUMMARY OF THE INVENTION

However, according to the method disclosed in Japanese Patent Application Laid-Open Nos. 2001-114149 and 2001-122044, infrared rays are diffusely reflected because infrared reflective pigment powder is mixed with resin. Hence, most of infrared rays incident on the interior part are absorbed into the resin layer, and therefore, a substantial preventive effect on the temperature increase cannot be obtained.

Moreover, the technology disclosed in Japanese Patent Translation Publication No. H8-507987 does not offer a fundamental solution to the problem. Specifically, solar radiation energy under the blazing sun reaches approximately 500 W/m² even in an environment where the solar radiation energy is mitigated by passing through heat insulating glass. This amount of heat is excessive with respect to a heat capacity of the interior part. Therefore, the preventive effect on the temperature increase of this technology is merely to slightly delay a time at which the temperature reaches an equilibrium temperature.

The present invention has been created in consideration of the above problems. It is an object of the present invention to provide an interior part of a vehicle, in which the temperature increase is controlled effectively.

According to one aspect of the present invention, there is provided an interior part of a vehicle, comprising: an outer wall constituted by a resin and/or a material containing the resin; and a thermal conductive member joined to the outer wall, wherein the thermal conductive member is partially joined to a vehicle body panel and/or a metal part engaged with the vehicle body panel.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, description will be made of embodiments of the present invention with reference to the drawings.

An interior part of a vehicle according to the present invention is composed of a part made of resin or a composite material containing the resin. The composite material is composed of, for example, a hybrid material formed by curing resin in which a wooden material or a fabric material such as felt is embedded, or composed of a laminated material including synthetic leather or fabrics as a skin. The interior part of a vehicle is, for example, an instrument panel, a door trim, a rear parcel shelf, a pillar garnish or the like.

Figure 1:
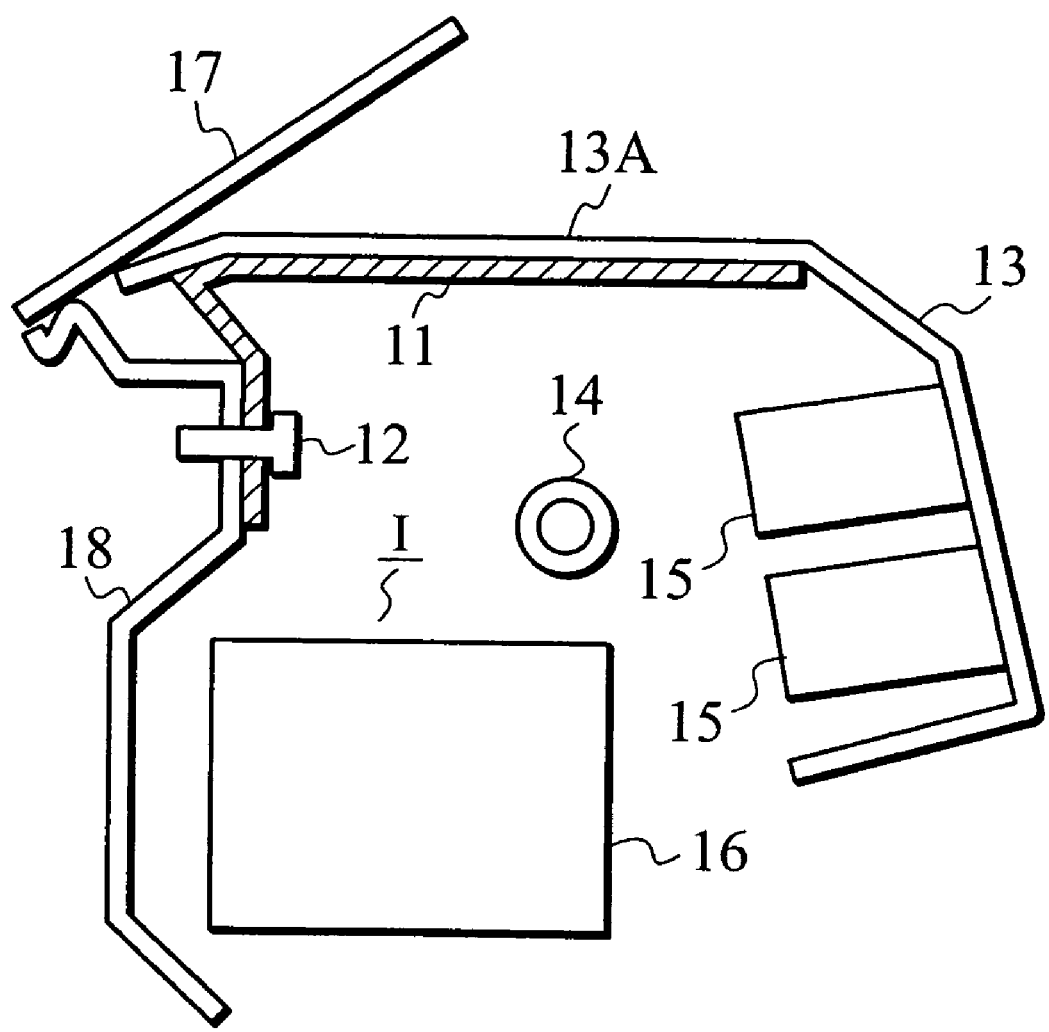
FIG. 1 is a schematic cross-sectional view for explaining the interior part of a vehicle of embodiment 1 according to the present invention.

An interior part of a vehicle according to Embodiment 1 of the present invention is described with reference to FIG. 1.

The interior part of a vehicle according to Embodiment 1 is an instrument panel, which includes the outer wall 13 to which the first thermal conductive member 11 is joined. In the inside I of the outer wall 13, the steering member 14, the electrical parts 15 and the air conditioner unit 16 are arranged. Note that the reference numeral 17 denotes a windshield.

The first thermal conductive member 11 is closely contacted with and laminated on the back surface of the top plate 13A of the outer wall 13, that is, on the inner side of the part. In addition, the first thermal conductive member 11 is partially joined to the dash panel 18 by means of the fastening member 12 made of, for example, a nut and bolt. Note that it is also possible to dispose the first thermal conductive member 11 either immediately under the skin or to the inside of the outer wall 13 by casting.

It is preferable that the shape of the first thermal conductive member 11 be in a sheet shape in order that the same first thermal conductive member 11 can be laminated on the outer wall 13 to form a continuous heat transfer path. The sheet-shaped first thermal conductive member 11, which strongly restrains the outer wall 13, is also advantageous from a viewpoint of restricting the thermal expansion of the part. However, it is not necessary for the first thermal conductive member 11 to cover the entire surface of the outer wall 13, and it is effective to dispose the first thermal conductive member 11 only on the top plate 13A which is exposed to solar radiation.

Furthermore, a shape including a hole and a net shape can be used for the first thermal conductive member 11 because the heat transfer capability thereof is extremely large. Therefore, a reduction in an amount of material to be used and weight reduction can be achieved while ensuring predetermined heat radiation performance. Specifically, the shape of the first thermal conductive member 11 can be made to correspond to the shape of the interior part and to a mounting layout of the electrical parts and the like. For example, for regions requiring rigidity, various application modes can be adopted, including a partial application of the sheet shape, and a combined application of the sheet and net shapes.

The instrument panel is a resin-molded member that includes a skin, which imparts a design and a texture thereto, and a base material for preserving the shape thereof. The instrument panel generally has thermal insulation properties. Therefore, the solar radiation energy that passes through the windshield 17 and reaches the skin is hardly released to the outside of the vehicle because the majority of the solar radiation energy is radiated into the vehicle cabin by thermal convection and radiation from the skin surface and the rest of the solar radiation is transferred to the inside of the part by thermal conductivity.

Thermoplastic resin, containing filler such as talc, applied for the base material has the thermal conductivity of approximately 0.5 W/m/K or less. Thermal conductivity of urethane foam applied for the cushion layer of the skin is approximately 0.03 W/m/K. However, the first thermal conductive member 11 is metal, thermal conductive ceramics, carbon fiber, graphite, or a resin composite containing the same as filler, and thermal conductivity thereof is 10 W/m/K or more.

As described above, the instrument panel that is a heat inlet onto which direct rays are incident and the dash panel 18 that is an ultimate heat-releasing part are thermally conducted to each other by the first thermal conductive member 11. Hence, the solar radiation energy absorbed by the instrument panel is efficiently transmitted to the entire vehicle body including the body panel and the structure of the vehicle and released to the atmosphere.

Specifically, the heat radiation capability in Embodiment 1 is enhanced, and therefore, the temperature increase of the instrument panel is effectively controlled. Hence, discomfort due to radiation heat emanated from the instrument panel under the environment of the blazing sun in summer season is greatly lowered, thus making it possible to enhance the comfort of the occupants. Furthermore, design to avoid the deformation and the interference caused by the thermal expansion of the instrument panel becomes unnecessary, and high quality material is not required for the instrument panel. Accordingly, the manufacturing costs of the instrument panel can be reduced.

Note that a vehicle body panel to which the first thermal conductive member 11 is joined is not limited to the dash panel 18 but may be appropriately selected depending on the location of the interior part. However, it is preferable to avoid a horizontal portion of a panel onto which the direct rays are incident and to select a part of the lower portion of the vehicle body where the temperature is relatively low, for example, a floor panel. This is for the purpose of ensuring a temperature gradient in relation to the interior part and the heat radiation characteristics.

The joining method of the first thermal conductive member 11 and the vehicle body panel is not limited to fastening by a nut and bolt. For example, fastening by screwing, welding or adhesion can be applied. In addition, a subsidiary use of a thermal conductive sealing material or paste can increase an area of the fastening portion and can also enhance the thermal conductivity by filling a gap of the fastening portion.

Metal is preferable for the material of the first thermal conductive member 11 when thermal conductivity is prioritized. Although the type of the metal is not particularly limited, a steel material is preferable from a viewpoint of the cost reduction, whereas aluminum, magnesium or an alloy thereof are preferable from a viewpoint of weight reduction and thermal conductivity. Specifically, the material can be selected appropriately in consideration of cost and performance.

The thermal conductivities of iron, aluminum and magnesium are approximately 80 W/m/K, 237 W/m/K and 156 W/m/K, respectively. For example, when a metal plate with a thickness of approximately 0.5 mm is laminated onto a 2 mm-thick base resin, the thermal conductivity can exhibit the performance thereof approximately 40 to 120 times that of the conductivity of the 2 mm-thick base resin alone.

Note that carbon fiber is preferable for the material of the first thermal conductive member 11 when weight reduction and thermal conductivity are considered important. For example, thermal conductivity of carbon fiber of a normal grade in a fiber direction is 180 W/m/K, and that of a highly thermal conductive grade is 1200 W/m/K. A specific gravity of the carbon fiber is approximately 2 g/cm$^3$, which is a value of approximately 80% of that of aluminum.

Coefficients of linear thermal expansion of iron, aluminum and carbon fiber are 1.2, 2.3 and −0.2 ($\times 10^{-5}$/° C), respectively. Meanwhile, the coefficient of linear thermal expansion of the thermoplastic resin containing the filler ranges approximately from 4 to 6 ($\times 10^{-5}/°$ C). Hence, the metal and the carbon fiber are preferable from a viewpoint of dimensional stability. For example, when a temperature difference of 100° C. from −30° C. to 70° C. is given, a dimensional difference of a 1 m-long steel plate is 1.2 mm. Meanwhile, a dimensional difference of a thermoplastic resin plate containing filler, whose length is 1 mm, is approximately 5 mm. Specifically, when a steel plate is used for the thermal conductive member, consideration of dimensional difference is not necessary. Accordingly, it is easy to design an interior part that prevents both deformation in the engaging portion thereof and for preventing interference with the adjacent parts. Thus, the mating portion of the adjacent parts maintains good appearance without any gaps. Since a mechanism for releasing the thermal expansion of the parts is no longer required, it is possible to adopt, for example, a strong joint and close contact between the interior parts.

Furthermore, the material of the first thermal conductive member 11 is not limited to a single material, and it is also possible to apply a composite material containing metal and a carbon fiber. For example, a laminated member of different types of metals such as iron and aluminum is preferable. This is because functions of the thermal conductivity and the rigidity can be respectively allocated to each type of metals. Meanwhile, a composite material formed by bonding the carbon fiber with the resin is preferable in that the functions of weight reduction and rigidity can be provided to each of the materials.

However, a resin composite material mixed with discontinuous filler such as metal powder and short fiber of carbon fiber greatly tends to have a material property dominated by matrix resin. Hence, selection of the matrix resin is important in order to obtain desired thermal property and dimensional stability.

Figure 2:
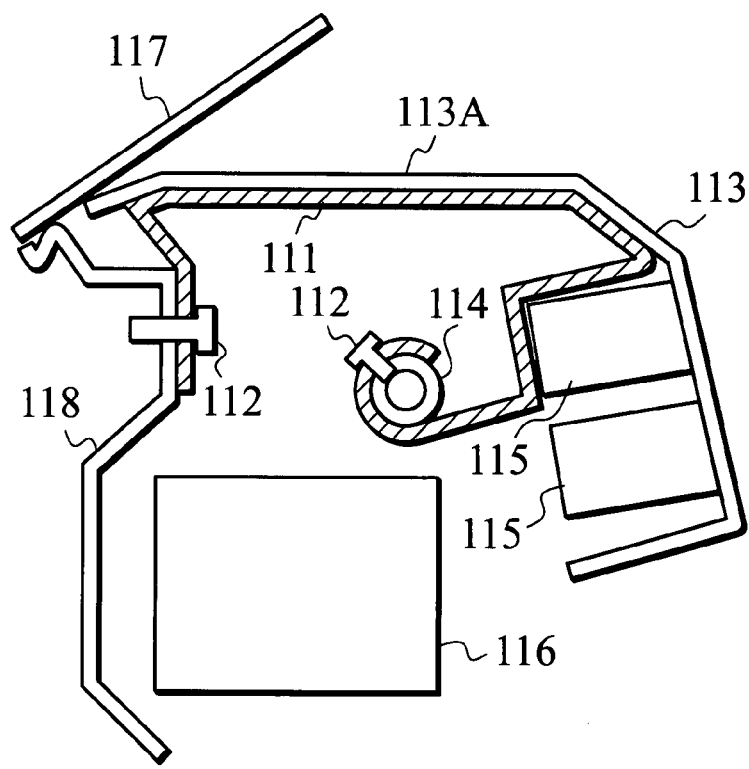
FIG. 2 is a schematic cross-sectional view for explaining the interior part of a vehicle of embodiment 2 according to the present invention.

Next, an interior part of a vehicle according to Embodiment 2 of the present invention is described with reference to FIG. 2.

Embodiment 2 is different from Embodiment 1 mainly in that one end of the first thermal conductive member 111 is further extended and joined to the steering member 114 that is a metal part. Specifically, the first thermal conductive member 111 is directly joined to, but not limited to the vehicle body panel, but also can be closely contacted with and joined to the metal part engaged with the vehicle body.

For more detail, in the first thermal conductive member 111 laminated on the back surface of the top plate 113A of the outer wall 113, one end thereof is joined to the dash panel 118, and the other end is joined to the steering member 114. Both ends of the steering member 114 are strongly engaged with the vehicle body panel (vehicle frame member). Therefore, the steering member 114 efficiently guides heat transmitted from the first heat conductive member 111 to the vehicle body panel.

Hence, the heat radiation capability is enhanced in Embodiment 2 because the dash panel 118 and the steering member 114 can be utilized as heat transfer paths. In addition, this configuration is suitable for parts for modularization. The reason is that, as far as an instrument panel module is concerned, main parts are engaged with the steering member 114.

Figure 3:
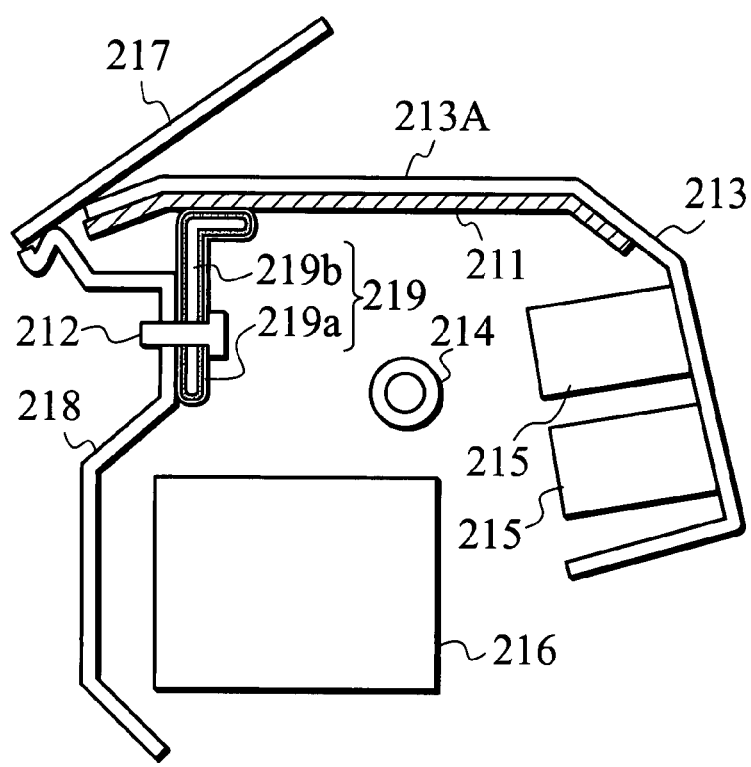
FIG. 3 is a schematic cross-sectional view for explaining the interior part of a vehicle of embodiment 3 according to the present invention.

Next, an interior part of a vehicle according to Embodiment 3 of the present invention is described with reference to FIG. 3.

For example, in some cases, it is impossible to preferably set the fastening position and the number of fastening points of the first thermal conductive member 211 due to a constraint regarding the layout or the structure. Therefore, in Embodiment 3, a part of the first thermal conductive member 211 is connected to the dash panel 218 by interposing the second thermal conductive member 219 that is separate from the first thermal conductive member 211.

Specifically, one end of the second thermal conductive member 219 is closely contacted with and joined to a part of the first thermal conductive member 211, and the other end of the second thermal conductive member 219 is joined to the dash panel 218 by the fastening member 212. Hence, in Embodiment 3, degrees of freedom concerning the fastening position and the number of fastening points of the first thermal conductive member 211 are enhanced.

Note that, similarly to the first thermal conductive member 211, the second thermal conductive member 219 can be configured as a sheet-shaped or stick-shaped member made of a material having good thermal conductivity, for example, copper or aluminum.

Moreover, it is also possible to compose the second thermal conductive member 219 of a heat pipe. The heat pipe is particularly preferable from a viewpoint of the thermal conductivity. Although the type of the heat pipe is not particularly limited, for example, a pipe 219a made of a material such as copper, aluminum or stainless steel, which uses water as working fluid 219b, can be utilized as shown in FIG. 3.

Concerning the joining of the heat pipe, the thermal conductivity can be enhanced by a method such as ensuring the conductivity by use of a pedestal having good thermal conductivity, a high thermal conductive sheet and the like. The thermal conductivity can be improved also by a method of thermally insulating a contact point on the interior part side and an exposed portion of the heat pipe between the both ends thereof, and the like.

Figure 4:
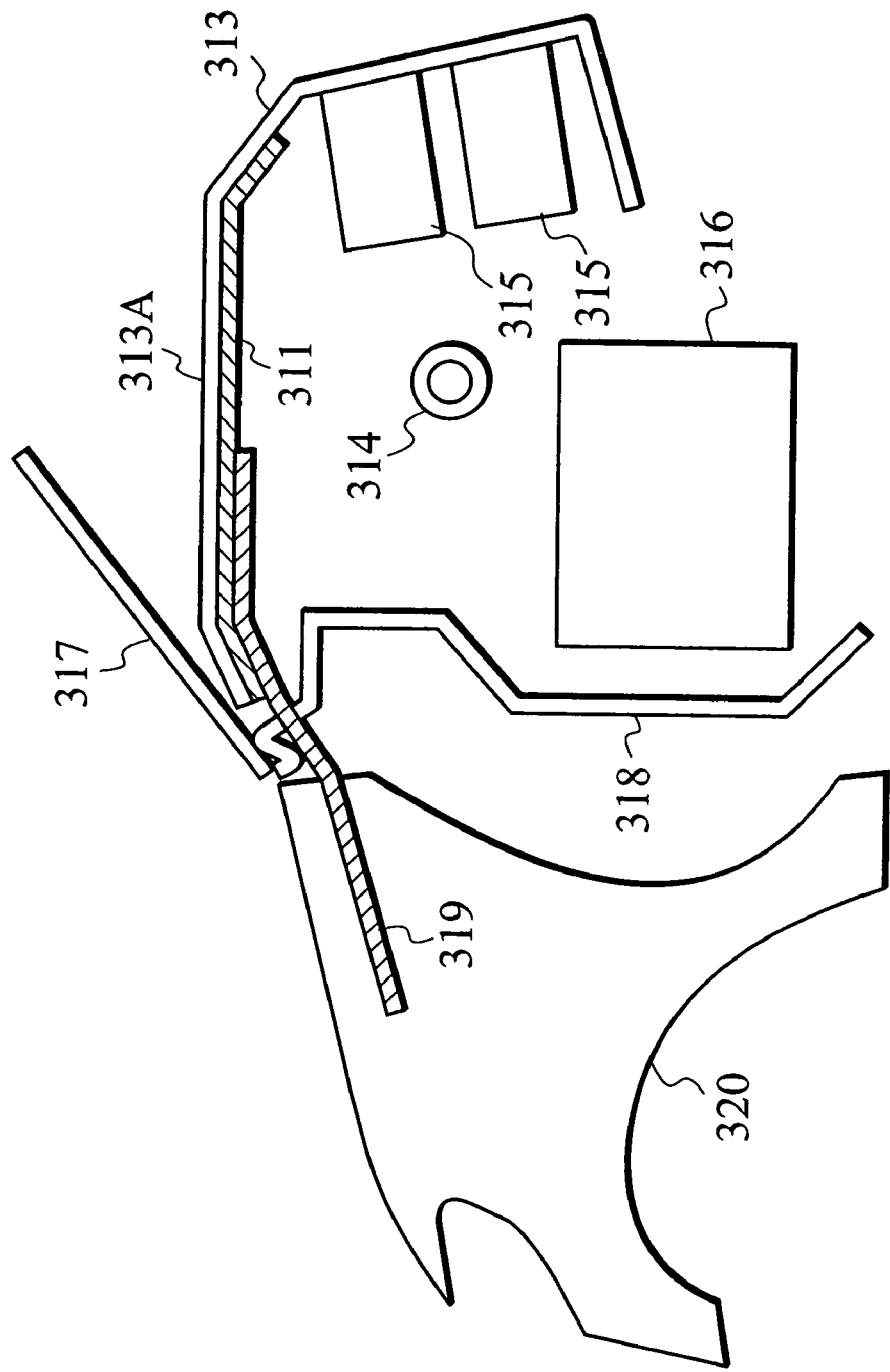
FIG. 4 is a schematic cross-sectional view for explaining the interior part of a vehicle of embodiment 4 according to the present invention.

Next, an interior part of a vehicle according to Embodiment 4 of the present invention is described with reference to FIG. 4.

Embodiment 4 is different from Embodiment 3 mainly in that the second thermal conductive member 319 that is separate from the first thermal conductive member 311 is partially joined to the front fender 320. Specifically, one end of the second thermal conductive member 319 is closely contacted with and joined to a part of the first thermal conductive member 311, and the other end of the second thermal conductive member 319 is extended over the dash panel 318 to be joined to the front fender 320.

Because the front fender 320 has a wide area, the front fender can be effectively utilized as a heat radiation plate by setting a large contact area with the second thermal conductive member 319. Hence, the heat radiation capability is enhanced in Embodiment 4.

Figure 5:
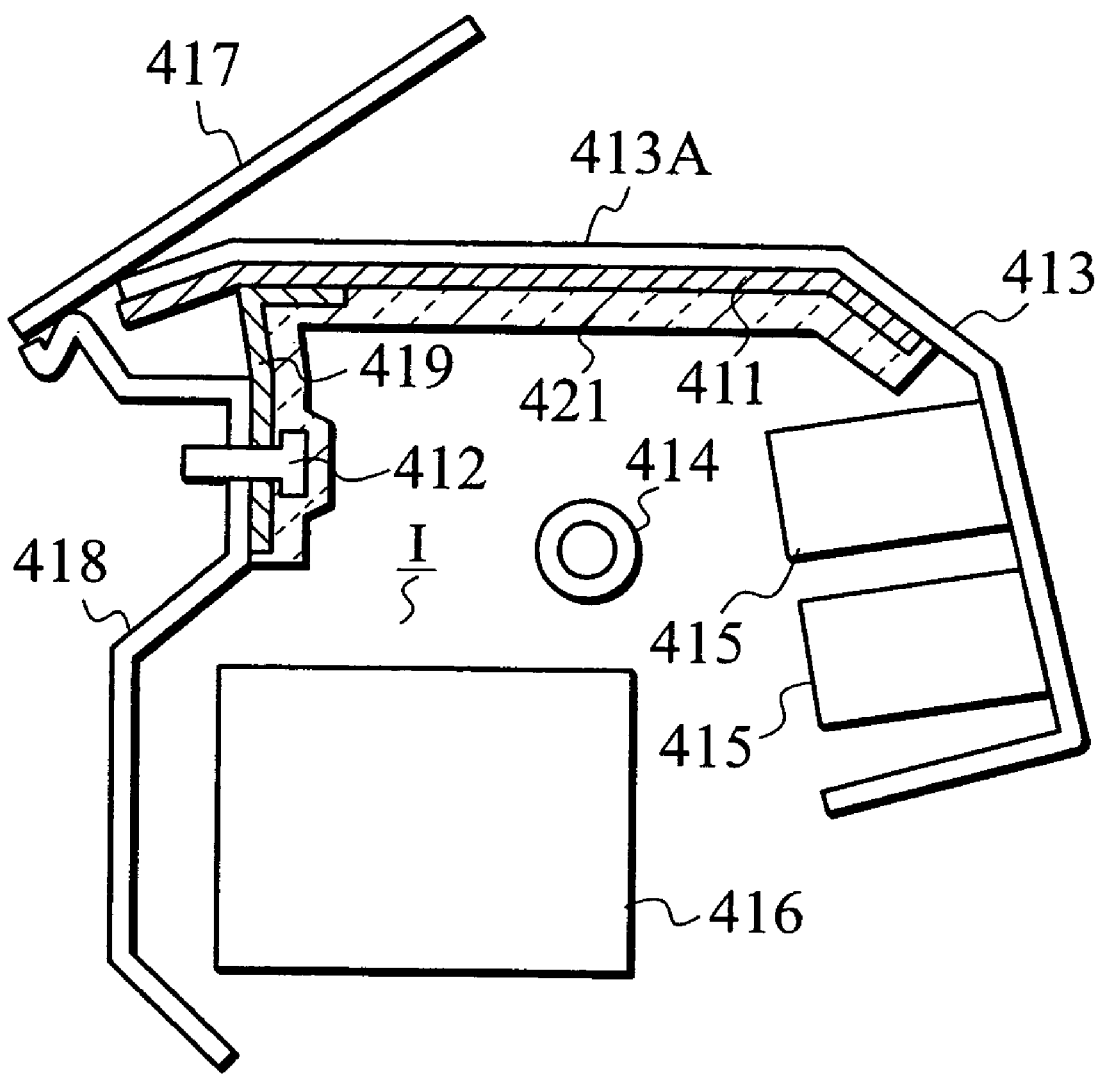
FIG. 5 is a schematic cross-sectional view for explaining the interior part of a vehicle of embodiment 5 according to the present invention.

Next, an interior part of a vehicle according to Embodiment 5 of the present invention is described with reference to FIG. 5.

Embodiment 5 is different from Embodiment 3 mainly in that the heat insulating layer 421 is provided. Particularly, the heat insulating layer 421 is placed on an inner side of a region (top plate 413A) to which the first thermal conductive member 411 is joined, and is also formed so as to cover the first thermal conductive member 411, the second conductive member 419 and the fastening member 412.

Hence, in Embodiment 5, heat transmitted from the first thermal conductive member 411 does not elevate the temperature of the parts or the inside of the cabin because the heat is prevented from leaking into the inner space I. Specifically, the heat transmitted from the first thermal conductive member 411 is efficiently transmitted to the dash panel 418.

Note that the material of the heat insulating layer 421 is not particularly limited, and for example, a resin foam sheet and a fiber heat insulating material can be utilized. Meanwhile, in the manufacturing process of the instrument panel, it is also possible to form the heat insulating layer 421 simultaneously when the cushion layer is formed by injecting urethane foam between the base material and the skin.

Figure 6:
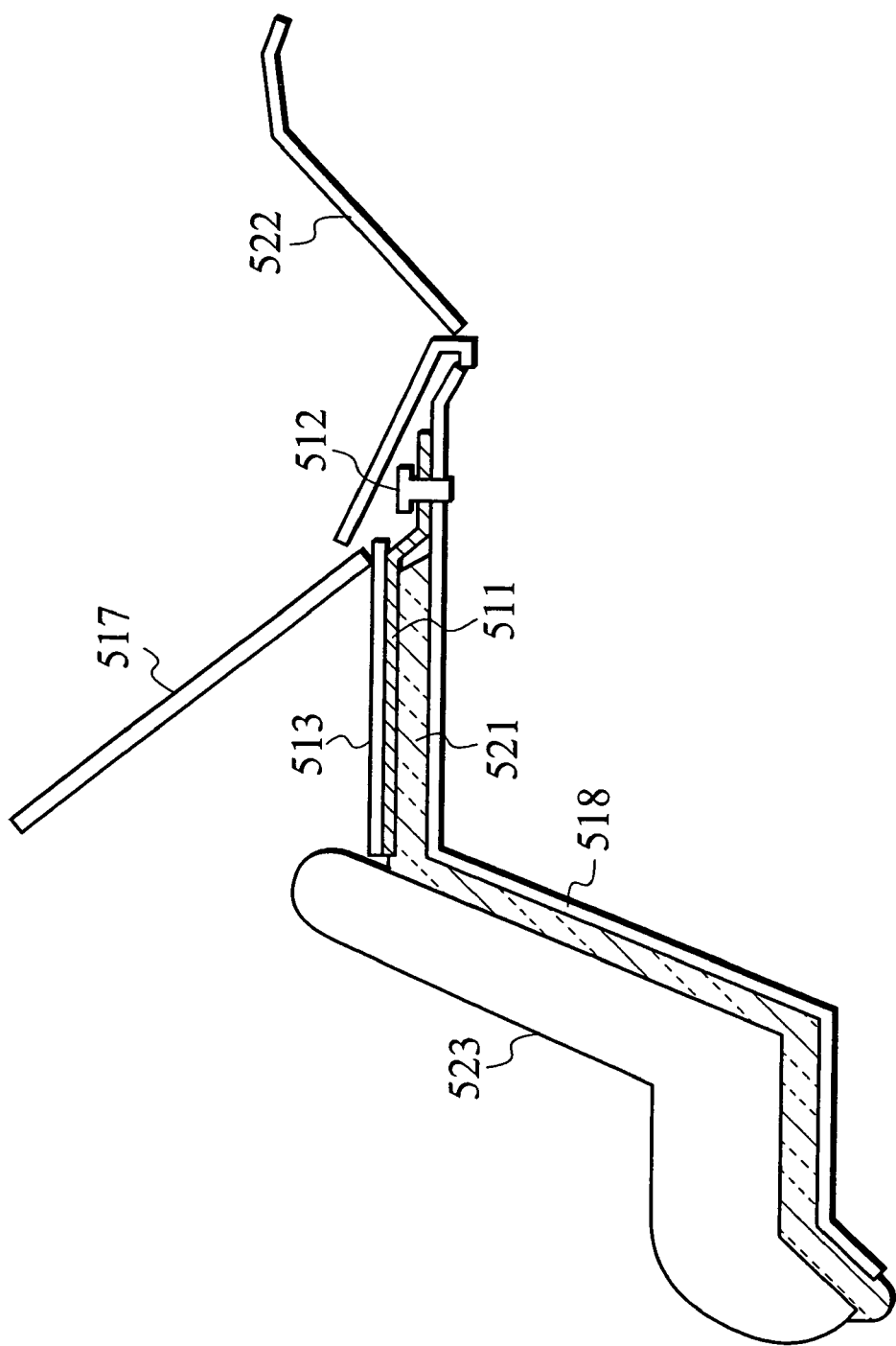
FIG. 6 is a schematic cross-sectional view for explaining the interior part of a vehicle of embodiment 6 according to the present invention.

Next, an interior part of a vehicle according to Embodiment 6 of the present invention is described with reference to FIG. 6.

The interior part of a vehicle according to Embodiment 6 is a rear parcel shelf onto which the direct rays passing through the rear glass 517 are incident, and includes the outer wall 513 to which the first thermal conductive member 511 is joined.

The first thermal conductive member 511 is closely contacted with and joined to the back surface of the outer wall 513, and a part of the first thermal conductive member 511 is directly joined to the partition wall 518 that partitions the back of the rear seat 523 and a trunk by the use of the fastening member 512. Note that the reference numeral 522 denotes a trunk lid.

In addition, the heat insulating layer 521 is disposed in order to prevent heat radiation into the vehicle cabin. The heat insulating layer 521 is disposed between the partition wall 518 and surfaces including an inner side of a region to which the first thermal conductive member 511 is joined and the back of the rear seat 523.

As described above, the rear parcel shelf, that is a heat inlet onto which direct rays are incident, and the partition wall 518, that is a final heat radiation region, are thermally conducted to each other by the first thermal conductive member 511. Hence, the solar radiation energy absorbed by the rear parcel shelf is efficiently transmitted to the partition wall 518, rear fenders, the inner and outer walls of the trunk and the like, and then released into the atmosphere.

Specifically, in Embodiment 6, since the heat radiation capability is enhanced, the increase of temperature of the rear parcel shelf is effectively controlled. Therefore, under the environment of the blazing sun in summer season, discomfort due to radiation heat emanated from the rear parcel shelf can be greatly lowered, and the comfort of the occupants can be improved.

Moreover, design to avoid deformation and interference, which are caused by the thermal expansion of the rear parcel shelf becomes unnecessary, and a high quality material is not required for the rear parcel shelf. Accordingly, the material cost of the rear parcel shelf can be reduced.

Furthermore, the vehicle body panel, which serves as a heat radiation region, is not limited to the partition wall 518, and for example, the rear fenders can also be selected as the heat radiation region.

Figure 7:
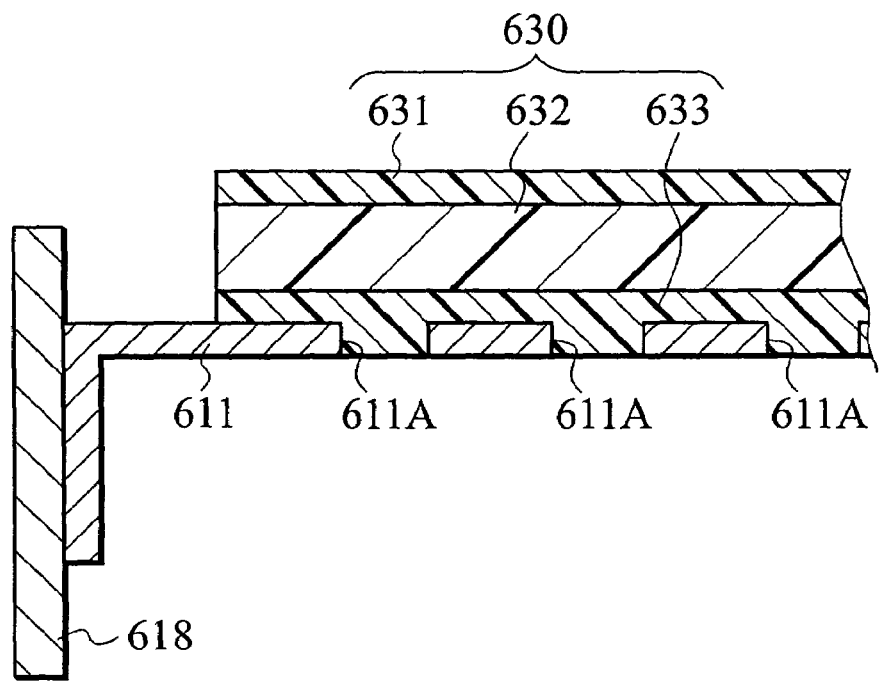
FIG. 7 is a partially enlarged cross-sectional view for explaining the interior part of a vehicle of embodiment 7 according to the present invention.

Next, an interior part of a vehicle according to Embodiment 7 of the present invention will be described with reference to FIG. 7.

In Embodiment 7, the first thermal conductive member 611 provided on the interior part onto which the direct rays are incident is a partially drilled metal plate, and includes the plurality of holes 611A. Moreover, the first thermal conductive member 611 is joined to the outer wall 630 of the interior part by an insert molding method. Note that the first thermal conductive member 611 is partially joined to the vehicle body panel 618.

In order that the interior part of the embodiment 7 is obtained, the first thermal conductive member 611 is inserted into a mold, and resin constructing the base material 633 of the outer wall 630 is injected thereinto. Thus, the resin constructing the base material 633 is flown into the holes 611A of the first thermal conductive member 611, then a molded member is obtained, in which the base material 633 and the first thermal conductive member 611 are strongly joined to each other mechanically. Then, the cushion layer 632 is formed in a manner that the molded member and the skin 631 are inserted into the mold, and for example, the urethane foam is injected into the mold and formed.

Note that no particular limitations are placed on the configuration of the skin 631. When the interior part is an instrument panel, a laminated member of the urethane foam and a vinyl chloride sheet with a grained surface may be applied. Moreover, when the interior part is a rear parcel shelf, nonwoven fabrics or tricot can be applied.

Hence, in Embodiment 7, a joining member such as an adhesive or a bolt is not necessary, and the first thermal conductive member 611 has excellent properties of close contact and durability. Particularly, because the holes 611A are formed in the first thermal conductive member 611, the thermal expansion thereof is securely restricted by the mechanical restraint of the holes 611A.

In addition, reductions in cost and weight can be achieved by adjusting the position and/or opening area ratio of the holes 611A while ensuring thermal conductivity and rigidity. For example, it is preferable to design to allow a small opening area ratio to the first thermal conductive member 611 located at a position immediately under the glass, where a received amount of heat is large, or located in the vicinity of the fastening region thereof with the vehicle body panel, where rigidity is required.

The method for joining the first thermal conductive member 611 and the interior part is not limited to the insert molding method as long as the first thermal conductive member 611 and the interior part are strongly contacted and laminated onto each other. The method thereof may be mechanical engagement or adhesion.

Figure 8:
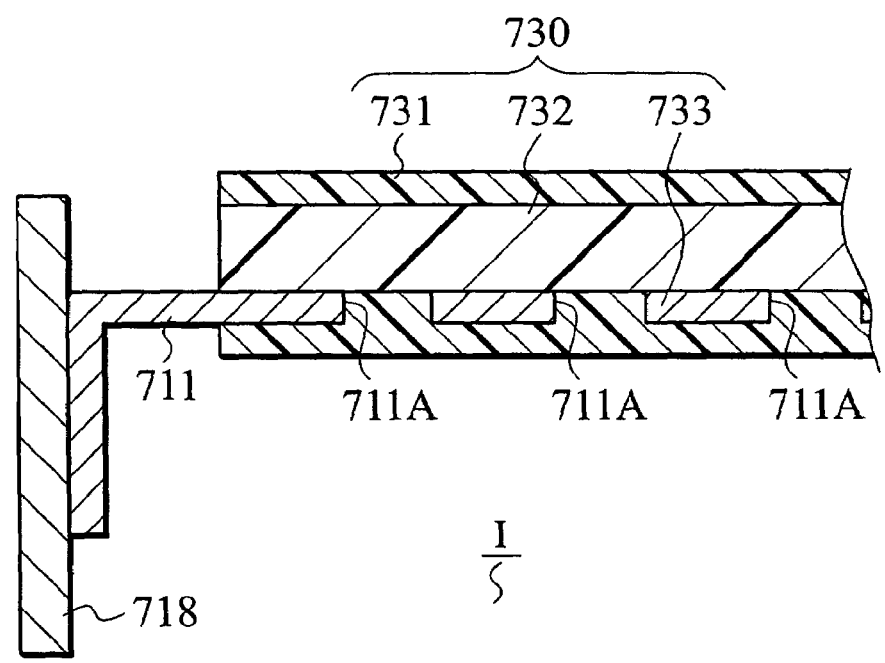
FIG. 8 is a partially enlarged cross-sectional view for explaining the interior part of a vehicle of embodiment 8 according to the present invention.

Next, an interior part of a vehicle according to Embodiment 8 of the present invention is described with reference to FIG. 8.

Embodiment 8 is different from Embodiment 7 mainly regarding the location of the first thermal conductive member 711 joined to the outer wall 730 of the interior part, onto which the direct rays are incident. For more detail, while the first thermal conductive member 611 according to Embodiment 7 is disposed on the back (inner side) of the base material 633 of the interior part, the first thermal conductive member 711 according to Embodiment 8 is disposed between the cushion layer 732 and base material 733 of the interior part.

Hence, in Embodiment 8, a spaced distance between the skin 731 of the outer wall 730 and the first thermal conductive member 711 is shortened, and therefore, the thermal conductivity from the skin 731 is enhanced. Meanwhile, the base material 733 of the outer wall 730 is located between the first thermal conductive member 711 and the inner space I, thus reducing the heat radiation into the inner space I.

Figure 9:
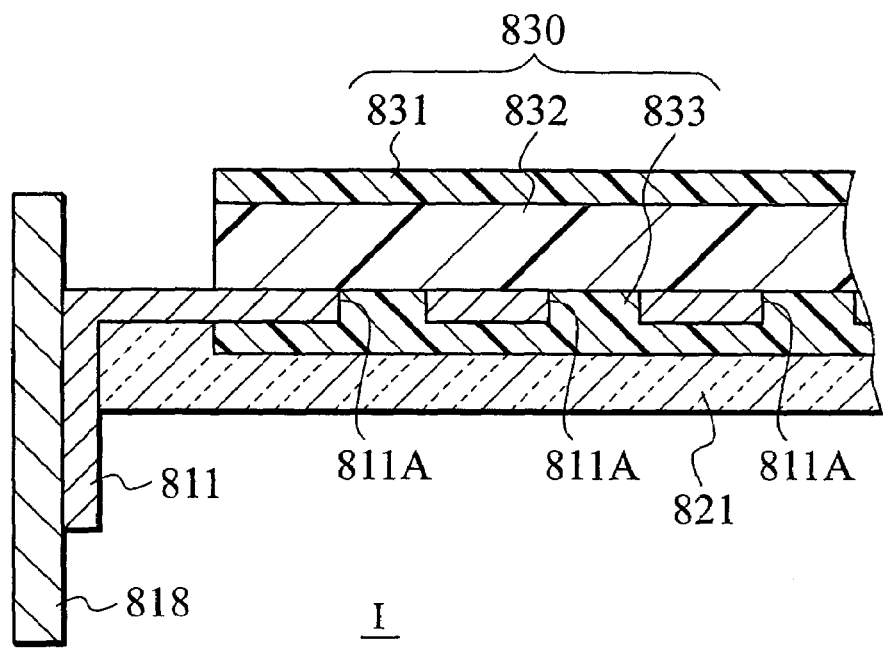
FIG. 9 is a partially enlarged cross-sectional view for explaining the interior part of a vehicle of embodiment 9 according to the present invention.

Next, an interior part of a vehicle according to Embodiment 9 of the present invention is described with reference to FIG. 9.

Embodiment 9 is different from Embodiment 8 in that a heat insulating layer 821 disposed on the inner surface of the base material 833 of the outer wall 830 of the interior part is provided.

Accordingly, in Embodiment 9, heat transmitted from the first thermal conductive member 811 is securely prevented from leaking into the inner space I, and therefore, the temperature of the parts or of the inside of the cabin are not increased. Specifically, the heat transmitted from the first thermal conductive member 811 is transmitted to the vehicle body panel 818 efficiently.

Figure 10:
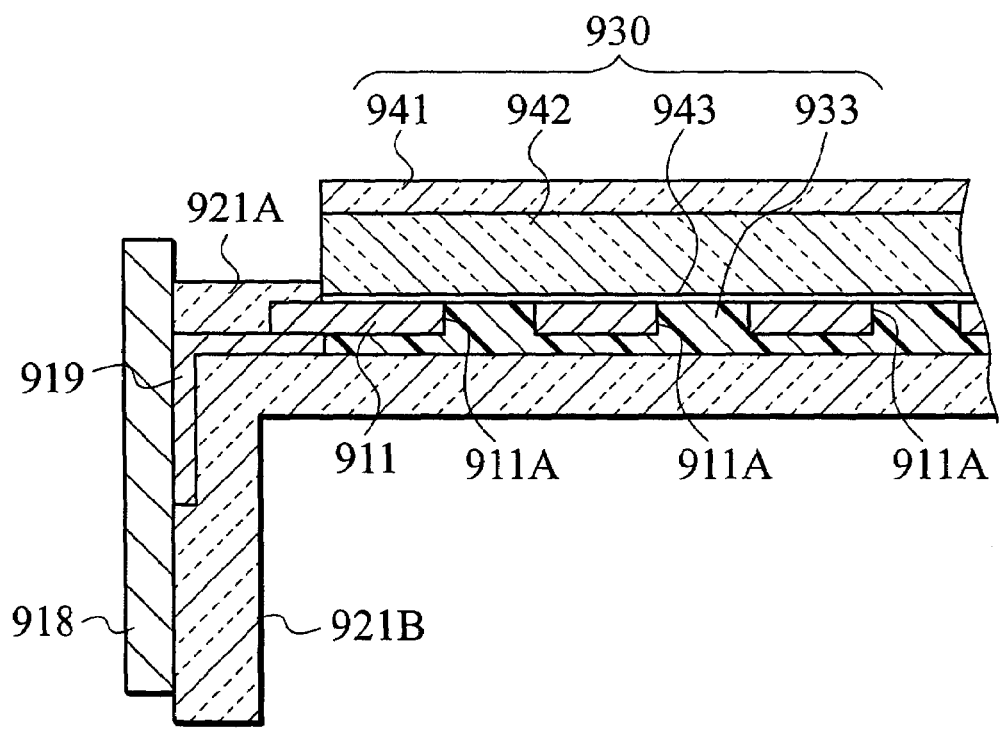
FIG. 10 is a partially enlarged cross-sectional view for explaining the interior part of a vehicle of embodiment 10 according to the present invention.

Next, an interior part of a vehicle according to Embodiment 10 of the present invention is described with reference to FIG. 10.

Embodiment 10 is different from Embodiment 9 mainly regarding the application of the second thermal conductive member 919 and the configuration of the outer wall 930.

Specifically, the first thermal conductive member 911 is partially joined to one end of the second thermal conductive member 919 that is a separate member, and the other end of the second thermal conductive member 919 is joined to the vehicle body panel 918. Moreover, the heat insulating layers 921A and 921B are disposed in order to prevent heat radiating into the inside of the part while the heat is being transmitted.

In addition, the outer wall 930 of the interior part includes the light transmitting layer 941, the heat insulating layer 942, heat converting layer 943, and the base material 933.

The light transmitting layer 941 is the uppermost layer of the skin and transmits the solar radiation therethrough. For the material of the light transmitting layer 941, it is preferable to use a transparent resin that does not contain pigment, for example, vinyl chloride resin, acrylic resin, polyester resin, and urethane resin. However, although some resins have some characteristics of absorbing near-infrared rays, it is possible for the resins to transmit most of solar radiation components therethrough by thinning the thickness of the light transmitting layer 941.

Moreover, in the case of applying fabrics for the light transmitting layer 941, a so-called bright yarn that does not contain much coloring pigment is preferable. As for the type of fiber, for example, polyester fiber, acrylic fiber, polyurethane fiber and polyolefin fiber are preferable.

The heat converting layer 943 is formed of a colored layer of, for example, black or a low light color, and effectively converts solar radiation transmitted therethrough into heat. Specifically, the solar radiation energy is converted into heat within the skin.

The heat insulating layer 942 is formed of, for example, an airspace gap, and prevents heat from conducting from the heat conversion layer 943 to the light transmitting layer 941 while transmitting the solar radiation therethrough. Specifically, the heat converted in the heat converting layer 943 is predominantly transferred to the first thermal conductive member 911 without being transmitted to the skin.

Hence, in Embodiment 10, the heat radiation into the vehicle cabin is further reduced, and heat transmitted from the first thermal conductive member 911 is efficiently transmitted to the vehicle body panel 918.

Note that the present invention is not limited to the above-mentioned Embodiments and can be modified variously within the scope of the claims.

Figure 11:
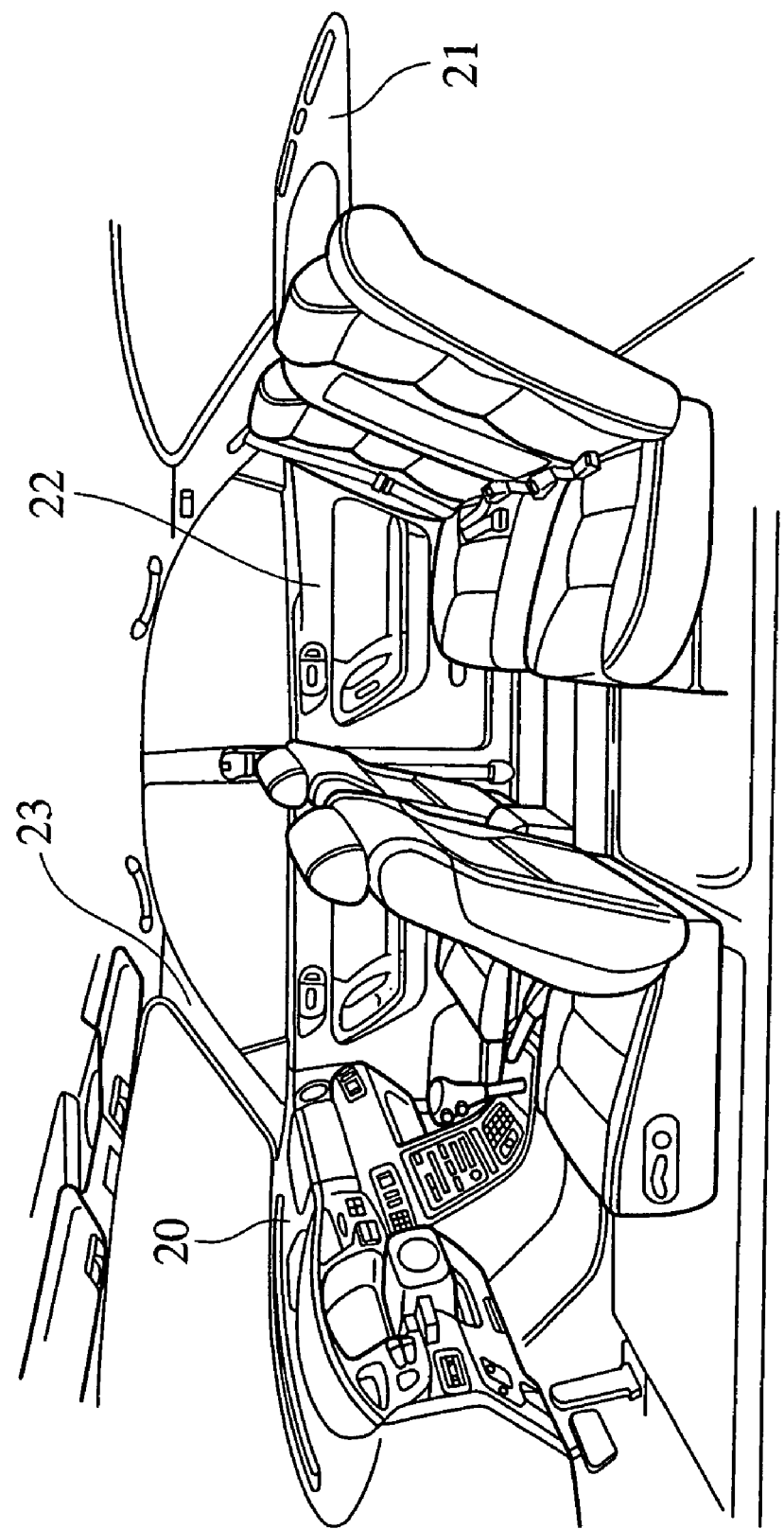
FIG. 11 is a view showing examples of the interior part of a vehicle according to the present invention.
Figure 12:
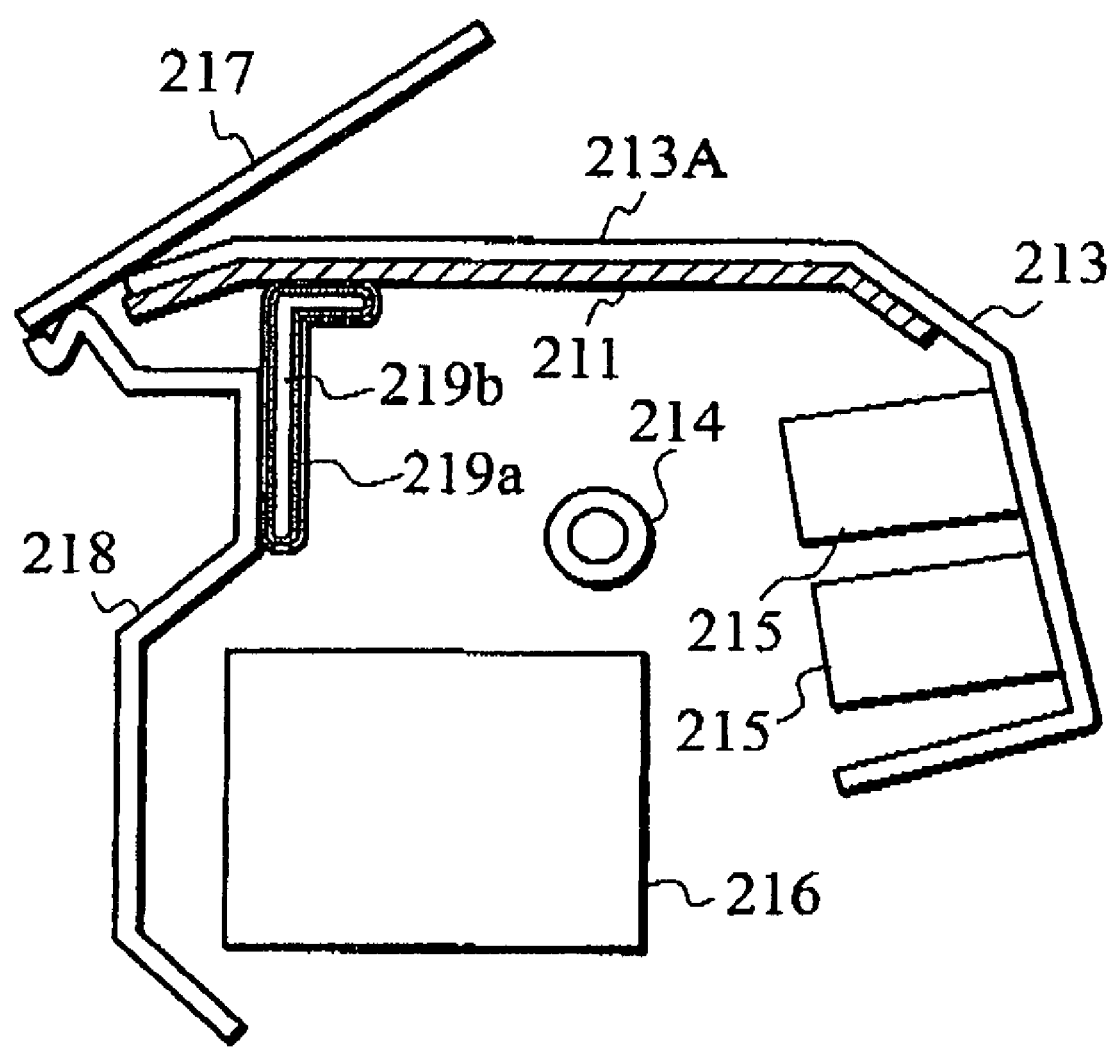
FIG. 12 is a view of the interior part of a vehicle according to an embodiment of the present invention.

As shown in FIG. 11, the interior part of a vehicle is not limited to the instrument panel 20 and the rear parcel shelf 21, and can apply to the door trim 22 and the pillar garnish 23 though areas thereof that receive the solar radiation are small. Furthermore, it is also possible for one or more combinations of components selected from the instrument panel 20, the door trim 22, the rear parcel shelf 21 and the pillar garnish 23 to apply as the interior part of a vehicle.

The entire content of a Japanese Patent Application No. P2002-201638 with a filing date of Jul. 10, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An interior part of a vehicle, comprising:
   an outer wall constituted by a resin and/or a material containing the resin;
   a first thermal conductive member joined to the outer wall; and
   a second thermal conductive member,
   wherein one end of the second thermal conductive member being joined to a part of the first thermal conductive member, and a second end of the second thermal conductive member being joined to a vehicle body panel and/or a metal part engaged with the vehicle body panel,
   wherein the second thermal conductive member is a heat pipe and the heat pipe is a pipe made of copper, aluminum or stainless steel, which is capable of flowing water.

2. The interior part of a vehicle according to claim 1, wherein the first and/or second thermal conductive member is formed of at least one of metal, carbon fiber and a composite material containing the metal and/or the carbon fiber.

3. The interior part of a vehicle according to claim 1, wherein the first thermal conductive member is in a sheet shape or in a net shape.

4. The interior part of a vehicle according to claim 1, wherein the first thermal conductive member is joined to a top plate of the outer wall.

5. The interior part of a vehicle according to claim 1, wherein the outer wall is a heat inlet and the vehicle frame member is a heat-releasing part.

6. The interior part of a vehicle according to claim 1, wherein the second end of the second thermal conductive member is joined to a dash panel.

7. An interior part of a vehicle according to claim 1, wherein the interior part of a vehicle applies to at least one of parts selected from an instrument panel, a door trim, a rear parcel shelf, and a pillar garnish.

* * * * *